(12) United States Patent
Sampath et al.

(10) Patent No.: US 7,567,621 B2
(45) Date of Patent: Jul. 28, 2009

(54) CAPACITY BASED RANK PREDICTION FOR MIMO DESIGN

(75) Inventors: Hemanth Sampath, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 725 days.

(21) Appl. No.: 11/022,347

(22) Filed: Dec. 22, 2004

(65) Prior Publication Data

US 2006/0018397 A1    Jan. 26, 2006

Related U.S. Application Data

(60) Provisional application No. 60/590,113, filed on Jul. 21, 2004.

(51) Int. Cl.
    H04B 7/06    (2006.01)
(52) U.S. Cl. .................................................. 375/267
(58) Field of Classification Search ............... 375/221, 375/260, 265, 267, 299; 370/208, 210; 455/24, 455/500, 69, 101
    See application file for complete search history.

(56) References Cited

U.S. PATENT DOCUMENTS

| | | | |
|---|---|---|---|
| 5,790,537 A | 8/1998 | Yoon et al. | |
| 5,812,938 A | 9/1998 | Gilhousen et al. | |
| 6,067,315 A | 5/2000 | Sandin | |
| 6,075,797 A | 6/2000 | Thomas | |
| 6,141,317 A | 10/2000 | Marchok et al. | |
| 6,154,484 A | 11/2000 | Lee et al. | |
| 6,175,550 B1 | 1/2001 | Van Nee | |
| 6,249,683 B1 | 6/2001 | Lundby et al. | |
| 6,271,946 B1 | 8/2001 | Chang et al. | |
| 6,449,246 B1 | 9/2002 | Barton et al. | |
| 6,477,317 B1 | 11/2002 | Itokawa | |

(Continued)

FOREIGN PATENT DOCUMENTS

| | | |
|---|---|---|
| DE | 10254384 | 6/2006 |
| WO | 2006019710 | 2/2006 |
| WO | 2006069300 | 6/2006 |

OTHER PUBLICATIONS

H. Sampath et al. "A Fourth Generation MIMO-OFDM Broadband Wireless System: Design, Performance and Field Trial Results", IEEE Communications Magazine, pp. 143-149, Sep. 2002.

(Continued)

*Primary Examiner*—Young T. Tse
(74) *Attorney, Agent, or Firm*—Kenneth K. Vu; Kenyon S. Jenckes

(57) ABSTRACT

The performance of a Single Code Word (SCW) design with low complexity MMSE receiver & rank prediction is similar to the Multiple Code Word (MCW) design with successive interference cancellation (SIC). A method of rank prediction comprises calculating MIMO channel matrices corresponding to layer transmissions for each tone, calculating signal-to-noise ratios (SNRs) for each tone based on the MIMO channel matrices, mapping the SNR for each tone to generate effective SNRs for each layer transmission, calculating additive white Gaussian noise (AWGN) capacities corresponding to the effective SNRs and maximizing an over-all spectral efficiency based on the AWGN capacities; and selecting a rank based on maximizing the over-all spectral efficiency.

16 Claims, 5 Drawing Sheets

SCW Transmitter with Rank Prediction

U.S. PATENT DOCUMENTS

| | | | |
|---|---|---|---|
| 6,478,422 | B1 | 11/2002 | Hansen |
| 6,487,243 | B1 | 11/2002 | Hwang et al. |
| 6,539,213 | B1 | 3/2003 | Richards et al. |
| 6,636,568 | B2 * | 10/2003 | Kadous ............... 375/225 |
| 6,785,341 | B2 | 8/2004 | Walton et al. |
| 6,821,535 | B2 | 11/2004 | Nurmi et al. |
| 6,829,293 | B2 | 12/2004 | Jones et al. |
| 7,006,848 | B2 | 2/2006 | Ling et al. |
| 7,184,713 | B2 * | 2/2007 | Kadous et al. ......... 455/67.13 |
| 7,292,651 | B2 | 11/2007 | Li |
| 2002/0122383 | A1 * | 9/2002 | Wu et al. ................ 370/210 |
| 2003/0112745 | A1 | 6/2003 | Zhuang et al. |
| 2005/0075073 | A1 * | 4/2005 | Kadous et al. ........... 455/63.1 |
| 2005/0088959 | A1 * | 4/2005 | Kadous ................ 370/208 |
| 2006/0133269 | A1 | 6/2006 | Prakash et al. |
| 2006/0133455 | A1 | 6/2006 | Agrawal et al. |
| 2006/0156199 | A1 | 7/2006 | Palanki et al. |

OTHER PUBLICATIONS

Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.

Blum et al, "On Optimum MIMO with antenna selection," IEEE International Conference on Communications Conference Proceedings, vol. 1, Apr. 28, 2002, pp. 386-390.

Catreux S et al: "Simulation Results for an Interference-Limited Multiple Input Multiple Output Cellular System" pp. 1094-1096; GLOBECOM'00. 2000 IEEE Global Telecommunications Conference, San Francisco, CA, Nov. 27-Dec. 1, 2000.

Kousa M A et al: "Adaptive Binary Coding for Diversity Communication Systems" IEEE International Conference on Personal Wireless Communications Proceedings. pp. 80-84, XP000992269, 1997.

Prasad N et al.: "Analysis of Decision Feedback Detecton for MIMO Rayleigh Fading Channels and Optimum Allocation of Transmitter Powers and QAM Constellations," pp. 1-10, 39th Annual Conference on Comm. Control and Comput., Monticello, IL Oct. 2001.

Seong Taek Chung et al: "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54, Oct. 7, 2001.

* cited by examiner

Figure 1: Conventional SCW transmitter

Figure 2: SCW Transmitter with Rank Prediction

Figure 3: Circular Multiplexing with $M_r = 4$, $M=2$, $B=1$

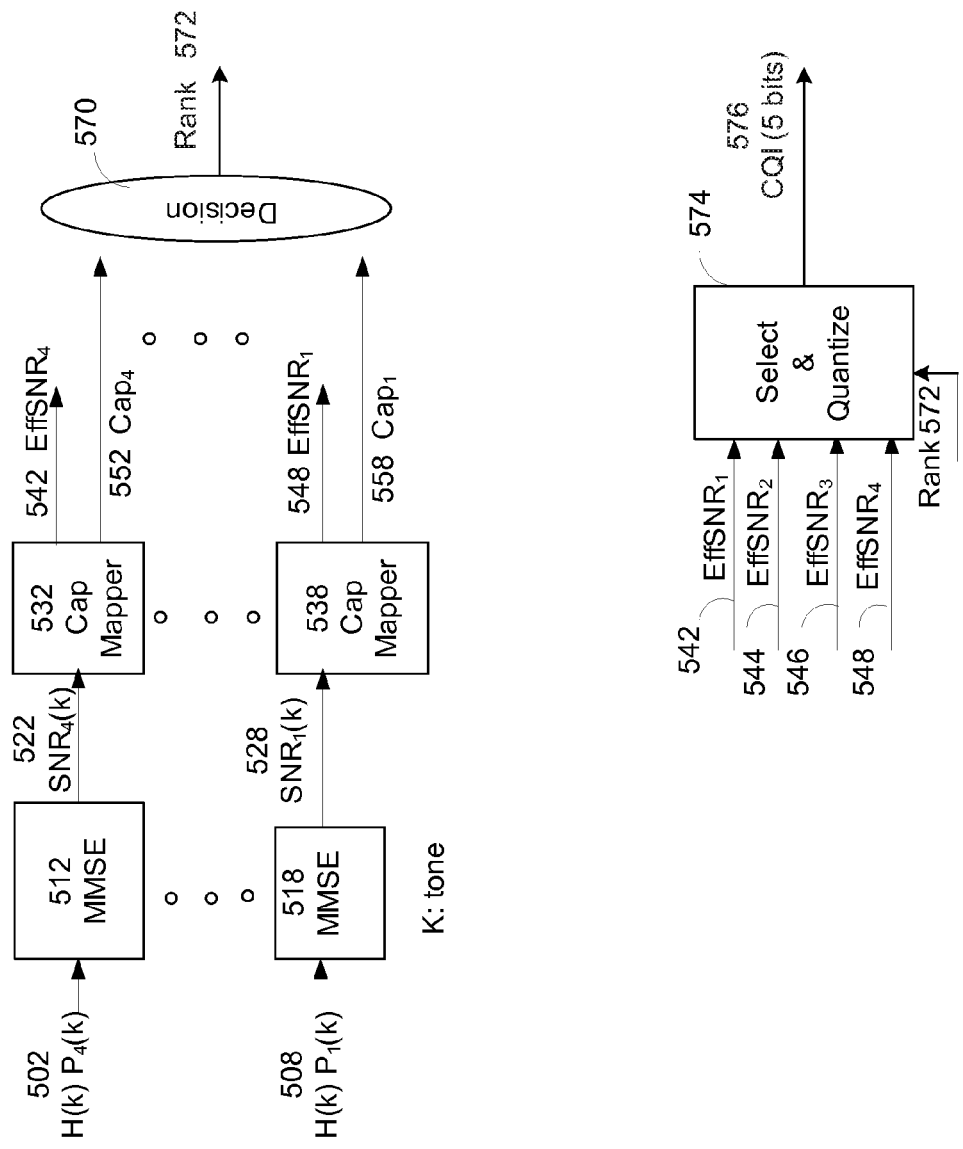
Figure 5: Performance Based Rank Prediction

CAPACITY BASED RANK PREDICTION FOR MIMO DESIGN

REFERENCE TO CO-PENDING APPLICATIONS FOR PATENT

The present Application for Patent is related to the following co-pending U.S. Patent Application: Ser. No. 11/021,791"Performance Based Rank Prediction for MIMO Design," filed Dec. 22, 2004, U.S. Pat. No. 6,636,568 entitled "Data Transmission with Non-Uniform Distribution of Data Rates for a Multiple-Input Multiple-Output (MIMO) System" and U.S. Provisional Application No. 60/590,113 filed Jul. 21, 2004 entitled "Efficient CQI Signaling Over Access Channel" are assigned to the assignee hereof, and expressly incorporated by reference herein.

BACKGROUND

I. Field

The present invention relates generally to communications, and more specifically to techniques for determining a distribution of a data stream to be transmitted via a multichannel, e.g., a multiple-input multiple-output (MIMO), orthogonal frequency division multiplexing (OFDM) communication system.

II. Background

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. If the propagation paths between the transmit and receive antennas are linearly independent (i.e., a transmission on one path is not formed as a linear combination of the transmissions on the other paths), which is generally true to at least an extent, then the likelihood of correctly receiving a data transmission increases as the number of antennas increases. Generally, diversity increases and performance improves as the number of transmit and receive antennas increases.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension. The MIMO system can provide improved performance (e.g., increased transmission capacity) if the additional dimensionalities created by the multiple transmit and receive antennas are utilized.

For a full-rank MIMO channel, where $N_S = N_T \leq N_R$, an independent data stream may be transmitted from each of the $N_T$ transmit antennas. The transmitted data streams may experience different channel conditions (e.g., different fading and multipath effects) and may achieve different signal-to-noise-and-interference ratios (SNRs) for a given amount of transmit power. Moreover, if successive interference cancellation processing is used at the receiver to recover the transmitted data streams (described below), then different SNRs may be achieved for the data streams depending on the specific order in which the data streams are recovered. Consequently, different data rates may be supported by different data streams, depending on their achieved SNRs. Since the channel conditions typically vary with time, the data rate supported by each data stream also varies with time.

The MIMO design has two modes of operation—the single code word (SCW) and multiple-code word (MCW).

In MCW mode, the transmitter can encode the data transmitted on each spatial layer independently, possibly with different rates. The receiver employs a successive interference cancellation (SIC) algorithm which works as follows: Decode the first layer, and then subtract its contribution from the received signal after re-encoding and multiplying the encoded first layer with an "estimated channel," then decode the second layer and so on. This "onion-peeling" approach means that each successively decoded layer sees increasing signal-to-noise (SNR) and hence can support higher rates. In the absence of error-propagation, MCW design with SIC achieves capacity. The disadvantage of this design arise from the burden of "managing" the rates of each spatial later—(a) increased CQI feedback (one CQI for each layer); (b) increased ACK/NACK messaging (one for each layer); (c) complications in Hybrid ARQ (HARQ) since each layer can terminate at different transmissions; (d) performance sensitivity of SIC to channel estimation errors with increased Doppler, and/or low SNR; and (e) Increased decoding latency requirements since each successive layer cannot be decoded until prior layers are decoded.

In the conventional SCW mode design, the transmitter encodes the data transmitted on each spatial layer with "identical data rates." The receiver can employ a low complexity linear receiver such as a Minimum Mean Square Solution (MMSE) or Zero Frequency (ZF) receiver, or non-linear receivers such as QRM, for each tone.

The SCW design overcomes the above mentioned implementation hassles of the MCW design. The drawback is that the SCW mode cannot support the MCW rates in spatially correlated channels or line-of-sight (LOS) channels with a high K-factor. Both of these scenarios lead to a loss in channel rank or increase in channel condition number and increased inter-layer interference. This dramatically lowers the effective SNR for each spatial layer. Hence, the data rate supported by each layer is lowered, which lowers the overall data rate.

K-factor is the ratio of the LOS channel power to the non-LOS channel power. Rank is the number of eigen-modes in the channel with non-zero energy. Condition Number is the ratio of the largest eigenvalue to the smallest eigen-value of the MIMO channel.

There is therefore a need in the art for techniques to distribute a data stream dynamically to be transmitted via a multi-channel, e.g., a multiple-input multiple-output (MIMO), orthogonal frequency division multiplexing (OFDM) communication system.

SUMMARY

In an aspect, a method of rank prediction comprises calculating MIMO channel matrices corresponding to layer transmissions for each tone, calculating signal-to-noise ratios (SNRs) for each tone based on the MIMO channel matrices, mapping the SNR for each tone to generate effective SNRs for each layer transmission, calculating additive white Gaussian noise (AWGN) capacities corresponding to the effective SNRs and denoted as $Cap_1$, $Cap_2$, $Cap_3$, $Cap_4$, selecting an absolute highest Cap of the highest Caps, and selecting a rank based on the selected absolute highest Cap.

In an aspect, a wireless communications device comprises means for calculating MIMO channel matrices corresponding to layer transmissions for each tone, means for calculating signal-to-noise ratios (SNRs) for each tone based on the MIMO channel matrices, means for mapping the SNR for each tone to generate effective SNRs for each layer transmission, means for calculating additive white Gaussian noise (AWGN) capacities corresponding to the effective SNRs and denoted as $Cap_1$, $Cap_2$, $Cap_3$, $Cap_4$, means for selecting an absolute highest Cap of the highest Caps, and means for selecting a rank based on the selected absolute highest Cap.

In an aspect, a processor is programmed to execute a method of rank prediction, the method comprising calculating MIMO channel matrices corresponding to layer transmissions for each tone, calculating signal-to-noise ratios (SNRs) for each tone based on the MIMO channel matrices, mapping the SNR for each tone to generate effective SNRs for each layer transmission, calculating additive white Gaussian noise (AWGN) capacities corresponding to the effective SNRs and denoted as $Cap_1$, $Cap_2$, $Cap_3$, $Cap_4$, selecting an absolute highest Cap of the highest Caps; and selecting a rank based on the selected absolute highest Cap.

In an aspect, a computer readable media embodying a method of rank prediction, the method comprises calculating MIMO channel matrices corresponding to layer transmissions for each tone, calculating signal-to-noise ratios (SNRs) for each tone based on the MIMO channel matrices, mapping the SNR for each tone to generate effective SNRs for each layer transmission, calculating additive white Gaussian noise (AWGN) capacities corresponding to the effective SNRs and denoted as $Cap_1$, $Cap_2$, $Cap_3$, $Cap_4$, selecting an absolute highest Cap of the highest Caps, and selecting a rank based on the selected absolute highest Cap.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIG. 5 shows a block diagram for capacity based rank prediction in accordance with an embodiment.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for performance based rank prediction may be used for various communication systems such as a Code Division Multiple Access (CDMA) system, a Wideband CDMA (WCDMA) system, a direct sequence CDMA (DS-CDMA) system, a Time Division Multiple Access (TDMA) system, a Frequency Division Multiple Access (FDMA) system, a High Speed Downlink Packet Access (HSDPA) system, an orthogonal frequency division multiplexing (OFDM)-based system, an Orthogonal Frequency Division Multiple Access (OFDMA) system, a single-input single-output (SISO) system, a multiple-input multiple-output (MIMO) system, and so on.

OFDM is a multi-carrier modulation technique that effectively partitions the overall system bandwidth into multiple (NF) orthogonal subbands. These subbands are also referred to as tones, subcarriers, bins, and frequency channels. With OFDM, each subband is associated with a respective subcarrier that may be modulated with data. Up to NF modulation symbols may be transmitted on the NF subbands in each OFDM symbol period. Prior to transmission, these modulation symbols are transformed to the time-domain using an NF-point inverse fast Fourier transform (IFFT) to obtain a "transformed" symbol that contains NF chips.

The SCW design overcomes the drawbacks of MCW design. However, SCW mode cannot support the MCW rates in spatially correlated channels or line-of-sight (LOS) channels with a high K-factor. Both of these scenarios lead to a loss in channel rank or increase in channel condition number and increased inter-layer interference. This dramatically lowers the effective SNR for each spatial layer. Hence, the data rate supported by each layer is lowered, which lowers the overall data rate. "Effective SNR" is (approximately) proportional to the geometric mean of the SNRs averaged over all tones.

One way to reduce interlayer interference is to lower the number of spatial layers transmitted in low-rank channels, and trade-off inter-layer interference and MIMO gains. For example, lowering the number of layers transmitted from four to three, i.e., decreasing the rank from four to three, can dramatically increase the effective SNRs for the three layers and hence the data rate supported by each layer. The net-effect is that a three-layer transmission can in-fact have a higher spectral efficiency compared to a four-layer transmission.

In an embodiment, the SCW design effectively trades off the interlayer interference and MIMO gains to maximize overall spectral efficiency. This is achieved via rank prediction, where the receiver feeds back an optimal number of layers for transmission in addition to a Carrier-Quality-to-Interference (CQI) to match the channel rank.

Conventional SCW Transmitter

Figure 1:
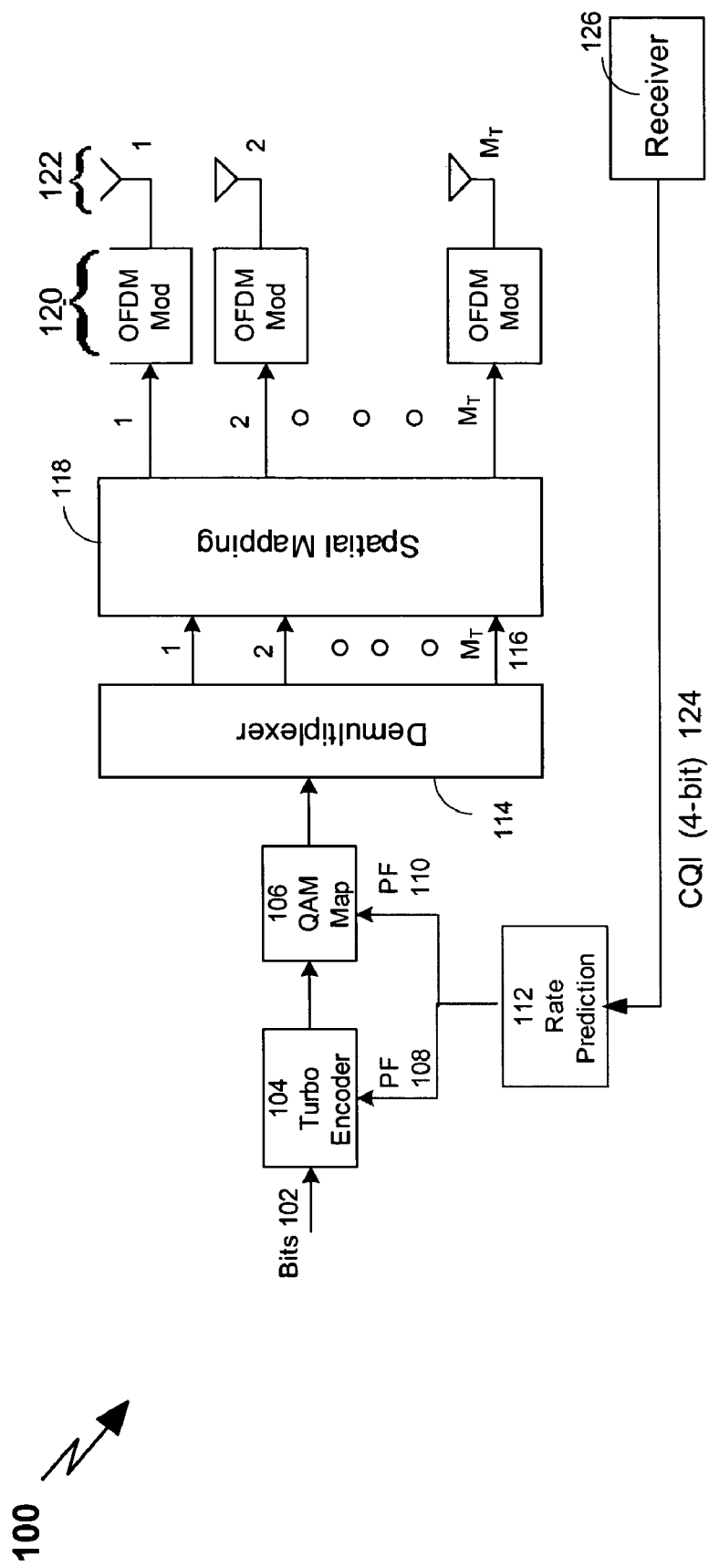
FIG. 1 shows a conventional SCW transmitter.

FIG. 1 shows a conventional SCW transmitter 100. The bits 102 are turbo-encoded 104 and QAM mapped 106 depending on the packet format (PF) 108, 110, specified by a rate prediction algorithm 112. The encoding is identical to a single-in-single-out (SISO) design. The coded symbols are then de-multiplexed 114 to MT layers 116, which are then spatially mapped 118 to MT OFDM modulators 120 and antennas 122. The OFDM processing for each transmit antenna proceeds then in an identical fashion as the SISO, after which the signals are launched into a MIMO wireless channel. The rate prediction algorithm uses a 4-bit CQI feedback 124 from receiver 126 every 5 msec. The CQI is a measure of effective SNR/spatial layer, measured at the receiver. The spatial mapping is done in manner to ensure that the SNR for each layer are similar. As explained before, the performance of this design suffers in low rank channels.

SCW Transmitter with Rank Prediction

In accordance with an embodiment, a single code word (SCW) design with rank prediction is described. Algorithms for robust rank prediction are presented below. For SNR<15 dB (90% of the users), the performance of the SCW design with low complexity MMSE receiver & rank prediction, is similar to the Multiple Code Word (MCW) design with successive interference cancellation (SIC). Without HARQ, SCW is better than MCW since MCQ is more sensitive to channel estimation errors. These factors make SCW attractive for MIMO due to smaller implementation complexity and overhead compared to MCW.

For SNR between 15 and 20 dB (10% of the users), the performance gap between SCW and MCW is less than 1.0 dB for low K channels, and 2-5 dB for high K channels. For high K channels, the performance degradation at high SNRs is lowered to 1-2 dB, by employing dual polarized antennas. In effect, the SCW design is within two dB of MCW design even at high SNRs. In the absence of HARQ, the performance of MCW is worse than SCW at SNR<15 dB, due to increased sensitivity of SIC to channel estimation errors.

Figure 2:
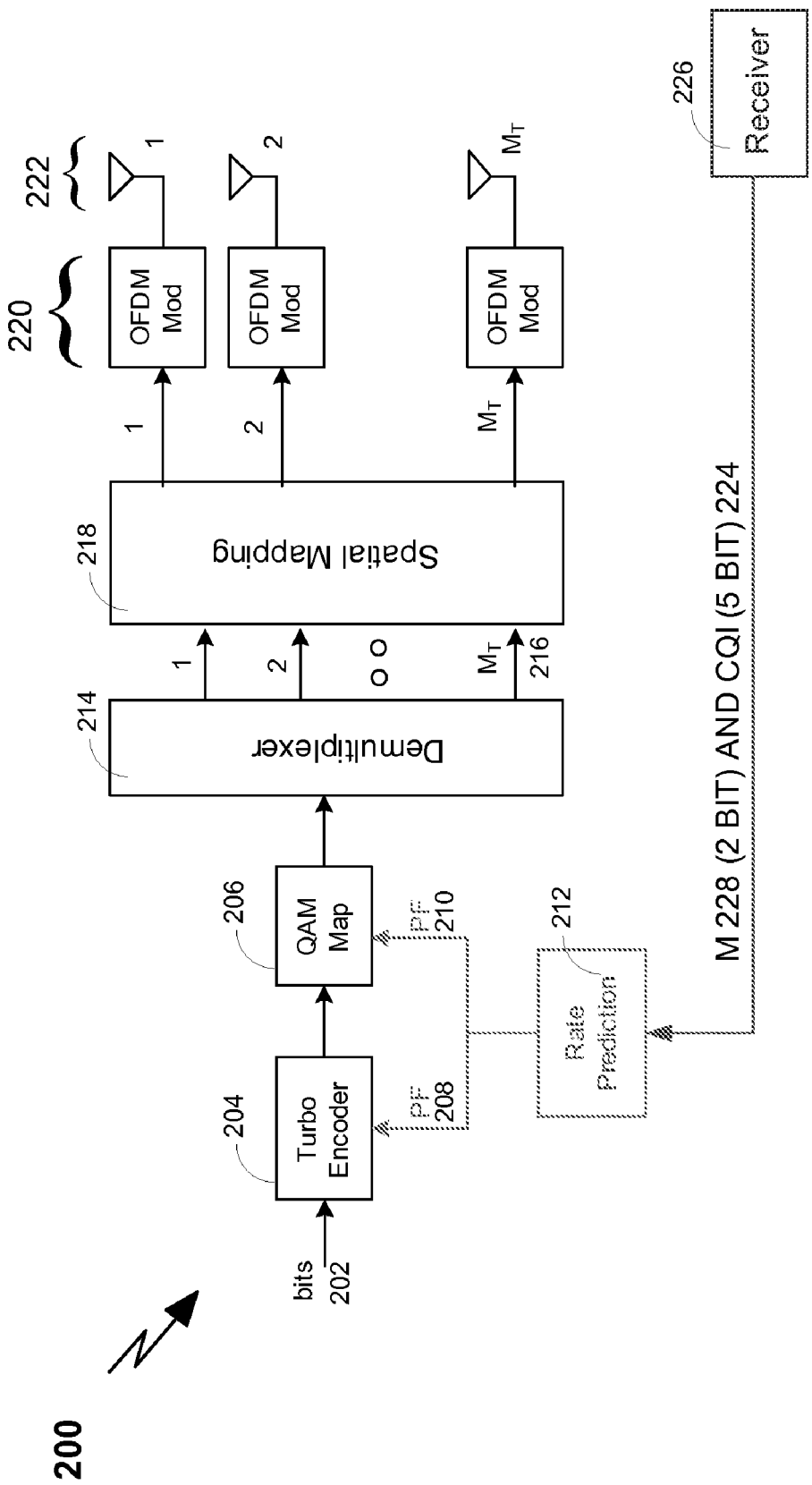
FIG. 2 shows an SCW transmitter with rank prediction in accordance with an embodiment.

FIG. 2 shows an SCW transmitter with rank prediction in accordance with an embodiment. The bits 202 are turbo-encoded 204 and QAM mapped 206 depending on the packet format (PF) 208, 210, specified by a rate prediction algorithm 212.

In an embodiment, the coded symbols are then de-multiplexed 214 to M streams 216 or layers ($1 \leq M \leq M_T$), where M 228 is a 2-bit integer $1 \leq M \leq M_T$ specified by the receiver 226 feedback every 5 m-sec, in addition to a 5-bit CQI 224. The M streams 216 are then spatially mapped 218 to $M_T$ OFDM modulators 220 and $M_T$ antennas 222.

Spatial Mapping

The spatial mapper (precoder) 218 is a $M_T \times M$ matrix P(k) that maps M symbols on to $M_T$ antennas, for each OFDM tone, k. There can be several choices for the precoder. Consider a $M_R \times M_T$ MIMO channel H(k). The precoder matrices can be chosen so that the equivalent channel matrix H(k)P(k) has improved frequency selectivity compared to H(k). The increased frequency selectivity can be exploited by the decoder to obtain frequency diversity gains.

In an embodiment, a precoder matrix is the following permutation matrix:

$$P_M(k) = \frac{1}{\sqrt{M}} \Pi\left[\left\lfloor \frac{k}{B} \right\rfloor \mod M_T\right]$$

where $\Pi(0), \Pi(1), \Pi(M_T-1)$ are the $M_T \times M$ sub-permutation matrices derived from the M columns of the identity matrix, $I_{M_T \times M_T}$ and B is a parameter to control the frequency selectivity of the equivalent channel.

In accordance with an embodiment, if $M_T=4, M=2$, then $$\Pi[0] = \begin{bmatrix} 1 & 0 \\ 0 & 1 \\ 0 & 0 \\ 0 & 0 \end{bmatrix}$$

$$\Pi[1] = \begin{bmatrix} 0 & 0 \\ 1 & 0 \\ 0 & 1 \\ 0 & 0 \end{bmatrix}$$

$$\Pi[2] = \begin{bmatrix} 0 & 0 \\ 0 & 0 \\ 1 & 0 \\ 0 & 1 \end{bmatrix}$$

$$\Pi[3] = \begin{bmatrix} 0 & 1 \\ 0 & 0 \\ 0 & 0 \\ 1 & 0 \end{bmatrix}$$

Figure 3:
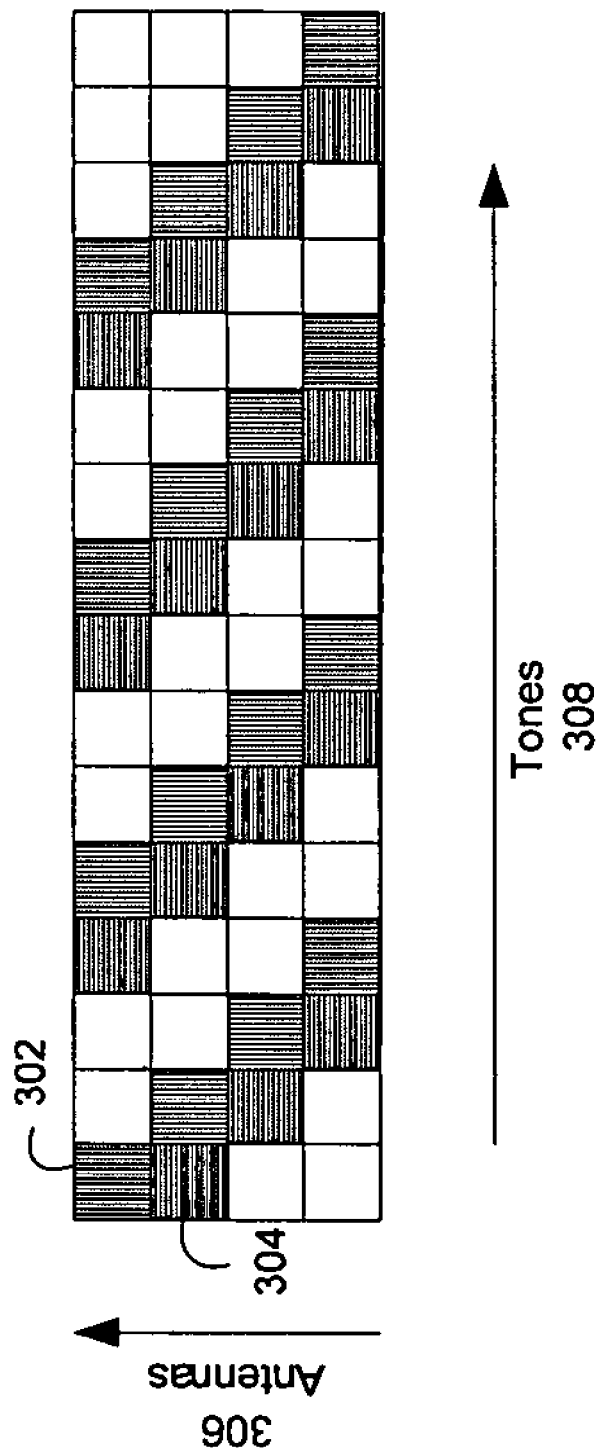
FIG. 3 shows circular multiplexing with $M_T=4, M=2, B=1$ in accordance with an embodiment.

For B=1, this leads to a circular multiplexing strategy with two layers as shown in FIG. 3 wherein the vertical-lined boxes 302 correspond to symbols from layer one and horizontal-lined boxes 304 correspond to symbols from layer 2.

FIG. 3 shows circular multiplexing with $M_T=4, M=2, B=1$. The vertical axis 306 represents antennas. The horizontal axis 308 represents tones.

Figure 4:
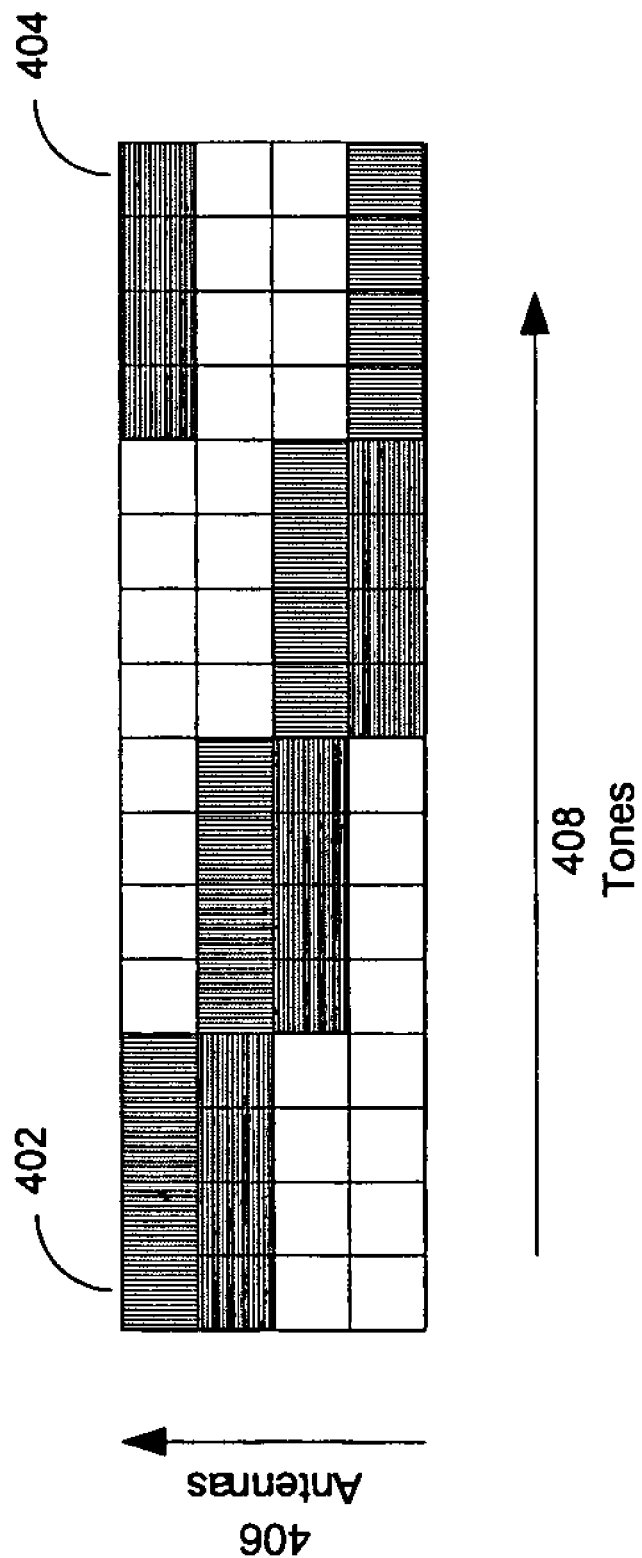
FIG. 4 shows block-circular multiplexing with $M_T=4$, $M=2$, $B=4$ in accordance with an embodiment.

For B=4, this leads to a block-circular multiplexing strategy with two layers as shown in FIG. 4 where the vertical-lined boxes 402 correspond to symbols from layer one and horizontal-lined boxes 404 correspond to symbols from layer 2. FIG. 4 shows block-circular multiplexing with $M_T=4, M=2, B=4$. The vertical axis 406 represents antennas. The horizontal axis 408 represents tones.

An increase in B leads to a reduction in the frequency selectivity of the equivalent channel, which may be desirable when weak codes are employed. Also, the parameter B is sensitive to channel interleaver choice, therefore parameter B may be optimized later on.

Circular multiplexing improves frequency diversity regardless of the channel delay spread. In the presence of strong turbo codes, the performance of CM (with M=1) approaches Space-Time transmit diversity (STTD). However, for very high PFs or for control channels that employ weak convolutional codes, STTD can out-perfom CM significantly.

In an embodiment, a precoder matrix is the following generalized delay diversity matrix:

$$P_M(k) = \frac{1}{\sqrt{M}} \Delta_{M_T \times M_T} \Theta_{M_T \times M}$$

where $\Theta_{M_T \times M}$ is a $M_T \times M$ sub-DFT matrix obtained from the M columns of the $M_T \times M_T$ DFT matrix, and $\Delta_{M_T \times M}$ is an $M_T \times M_T$ diagonal matrix, with the $(j,j)^{th}$ entry given by $$\exp\left[\frac{j2\pi(k-1)\delta}{N}\right].$$

The parameter $\delta$ is the delay-parameter, which also controls the frequency selectivity of the channel, and N is the number of OFDM tones. We note that for M=1, the above precoding matrix implements the "pure" delay diversity. The performance of delay diversity is strictly worse than circular multiplexing (and STTD), and has poor performance in LOS channel conditions for high PF. The only advantage of using delay diversity is that it benefits from improved SISO channel estimation gains at very low SNRs (SNR<−5 dB) and for high mobility (>120 kmph). In these channel scenarios, circular multiplexing cannot benefit from SISO channel estimation gains.

Packet Formats

A current SISO design uses 7 PFs with spectral efficiencies [0.5, 1,1.5,2.0,2.5, 3.0,4.0] bps/Hz. In the SCW design employing a one-layer transmission, this granularity in spectral efficiency (SE) should be sufficient. However, when all four layers are used for transmission, this translates to spectral efficiencies of [2, 4, 6, 8, 10, 12, 16] bps/Hz, with a SE granularity on the order of 2-4 bps/Hz. A consequence of this coarse granularity is a loss in data rate, since these users are constrained to transmit at a much lower data rate than their attainable SE. Note that MCW design with SIC does not have this granularity problem, since the rate in each layer can be adjusted independently, resulting in an overall finer spectral efficiency granularity.

TABLE 1

Packet Format for SCW Design with Rank Prediction

| Packet Format | Modulation | Code Rate after one Frame | Spectral Efficiency Per Layer after N frames of transmission | | | | | |
|---|---|---|---|---|---|---|---|---|
| | | | 1 | 2 | 3 | 4 | 5 | 6 |
| 0 | 2 | 1/4 | 0.50 | 0.25 | 0.17 | 0.13 | 0.10 | 0.08 |
| 1 | 2 | 3/8 | 0.75 | 0.38 | 0.25 | 0.19 | 0.15 | 0.13 |
| 2 | 2 | 1/2 | 1.00 | 0.50 | 0.33 | 0.25 | 0.20 | 0.17 |
| 3 | 4 | 5/16 | 1.25 | 0.63 | 0.42 | 0.31 | 0.25 | 0.21 |
| 4 | 4 | 3/8 | 1.50 | 0.75 | 0.50 | 0.38 | 0.30 | 0.25 |
| 5 | 4 | 7/16 | 1.75 | 0.88 | 0.58 | 0.44 | 0.35 | 0.29 |
| 6 | 4 | 1/2 | 2.00 | 1.00 | 0.67 | 0.50 | 0.40 | 0.33 |
| 7 | 4 | 9/16 | 2.25 | 1.13 | 0.75 | 0.56 | 0.45 | 0.38 |
| 8 | 6 | 5/12 | 2.50 | 1.25 | 0.83 | 0.63 | 0.50 | 0.42 |
| 9 | 6 | 11/24 | 2.75 | 1.38 | 0.92 | 0.69 | 0.55 | 0.46 |
| 10 | 6 | 1/2 | 3.00 | 1.50 | 1.00 | 0.75 | 0.60 | 0.50 |
| 11 | 6 | 13/24 | 3.25 | 1.63 | 1.08 | 0.81 | 0.65 | 0.54 |
| 12 | 6 | 7/12 | 3.50 | 1.75 | 1.17 | 0.88 | 0.70 | 0.58 |
| 13 | 6 | 5/8 | 3.75 | 1.88 | 1.25 | 0.94 | 0.75 | 0.63 |
| 14 | 6 | 2/3 | 4.00 | 2.00 | 1.33 | 1.00 | 0.80 | 0.67 |
| 15 | 6 | 17/24 | 4.25 | 2.13 | 1.42 | 1.06 | 0.85 | 0.71 |

Table 1 shows the packet format for SCW design with rank prediction in accordance with an embodiment. Table 1 shows the PFs with SEs targeting the first to sixth transmission. 16 PFs are provisioned with SE-per-layer ranging from 0.5 bps/Hz/layer to 4.25 bps/Hz/layer with 0.25 bps/Hz/layer increments targeting the first transmission. When targeting the third transmission, the maximum attainable SE-per-layer is 1.42 bps/Hz/layer. The SE between 1.42 bps/Hz/layer and 2.13 bps/Hz/layer can be achieved by targeting the second transmission and SE greater than 2.13 bps/Hz/layer can be achieved by targeting the first transmission, where HARQ benefits diminish.

In another embodiment, more PF#s may be added with SE/layer>4.25 bps/Hz so that higher SE can be achieved by targeting the third transmission, and benefit from HARQ gains. In such a case, a 6-bit CQI may be needed to ensure that the PF granularity is captured.

Capacity Based Rank Prediction Algorithm

FIG. 5 shows a block diagram for a capacity based rank prediction in accordance with an embodiment. For the kth tone, $H(k)P_4(k)$ 501 through $H(k)P_1(k)$ 508 are input into MMSE 512 through MMSE 518, respectively. MMSE 512 through MMSE 518 produce $SNR_4(k)$ 522 through $SNR_1(k)$ 528, respectively. $SNR_4(k)$ 522l through $SNR_1(k)$ 528 are input into Cap Mapper 532 through Cap Mapper 538, respectively. Cap Mapper 532 through Cap Mapper 538 produces $EffSNR_4$ 542 through $EffSNR_1$ 548, respectively, and $Cap_4$ 552 through $Cap_1$ 558, respectively. $Cap_4$ 552 through $Cap_1$ 558 are input into a decision unit 570. Decision unit 570 produces a rank 572.

$EffSNR_1$ 542 through $EffSNR_4$ 548 and the rank 572 are input into a select & quantize unit 574. The select & quantize unit 574 produces a five-bit CQI 576.

In accordance with an embodiment, the capacity based rank prediction algorithm works as follows:

1. At each tone, the 4×4, 4×3, 4×2 and 4×1 MIMO channel matrices, $H(k)P_1(k)$ $H(k)P_2(k)$ $H(k)P_3(k)$ and $H(k)P_4(k)$, corresponding to the {1,2,3,4} layer transmissions, are calculated. Assuming an MMSE receiver, the post-processing SNRs for {1,2,3,4} layer transmissions, $SNR_1(k)$, $SNR_2(k)$, $SNR_3(k)$, $SNR_4(k)$ are calculated for each tone as:

$$SNR_M(k) \approx \frac{1}{M} \sum_{m=0}^{M-1} \left[ diag\langle [P_M(k)^* H(k)^* H(k) P_M(k) + \sigma^2 I]^{-1}\rangle \right]^{-1}_{m,m} \quad \forall M = [1,4]$$

If we assume other receivers such as QRM-MLD or IDD, the post processing SNRs will be calculated in a different fashion.

2. An unconstrained-capacity mapping is then employed to generate an effective-SNR averaged over all tones, for the {1,2,3,4} layer transmissions, We denote them as $EffSNR_1$, $EffSNR_2$, $EffSNR_3$, $EffSNR_4$. The additive white Gaussian noise (AWGN) capacities corresponding to the effective SNRs are denoted as $Cap_1$, $Cap_2$, $Cap_3$, $Cap_4$.

3. The optimum rank/layer is chosen so as to maximize the over-all spectral efficiency, i.e., $$\hat{M} = \underset{M=[1,4]}{\operatorname{argmax}} [M \times Cap_M].$$

A 5-bit CQI is then fed-back, where $CQI(\hat{M})=Quant[EffSNR_{\hat{M}}]$.

It would be apparent to those skilled in the art that known techniques for calculating additive white Gaussian noise (AWGN) capacities may be utilized.

The techniques described herein may be used for a variety of OFDM-based systems as well as other systems. The rank prediction techniques described herein may be implemented by various means. For example, these techniques may be implemented in hardware, software, or a combination thereof. For a hardware implementation, the processing units used to perform interference control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the interference control techniques may be implemented with modules (e.g., procedures, functions, and so on) that perform the functions described herein. The software codes may be stored in a memory unit and executed by a processor. The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of rank prediction, comprising:
   calculating MIMO channel matrices corresponding to layer transmissions for each tone;

calculating signal-to-noise ratios (SNRs) for each tone based on the MIMO channel matrices;

mapping the SNRs using a mapper for each tone to generate effective SNRs for each layer transmission;

calculating additive white Gaussian noise (AWGN) capacities corresponding to the effective SNRs and denoted as $Cap_1$, $Cap_2$, $Cap_3$, $Cap_4$;

selecting an absolute highest AWGN capacity, Cap;

selecting a rank based on the selected absolute highest Cap; and transmitting a ranking to transmitting side which indicates the layer transmissions to select for transmission so as to maximize spectral efficiency.

2. The method of claim 1, further, comprising sending a quality indicator based on the selected rank.

3. The method of claim 2, wherein the quality indicator is Carrier-Quality-to-Interference (CQI).

4. The method of claim 3, wherein the quality indicator CQI is calculated as $$CQI(\hat{M}) = \text{Quant}[\mathit{EffSNR}_{\hat{M}}],$$

where EffSNR is the effective SNR of the selected rank.

5. The method of claim 1, wherein the number of layer transmission is four.

6. The method of claim 1, wherein the SNR is calculated as $$SNR_M(k) \approx \frac{1}{M} \sum_{m=0}^{M-1} \left[\text{diag}\big([P_M(k) * H(k) * H(k) P_M(k) + \sigma^2 I]^{-1}\big)\right]_{m,m}^{-1} \forall\, M = [1,4],$$

where k is the kth tone, $H(k)P_1(k)$, $H(k)P_2(k)$, $H(k)P_3(k)$ and $H(k)P_4(k)$ correspond to the layer transmissions.

7. The method of claim 1, wherein the mapping is unconstrained with respect to capacity.

8. The method of claim 1, wherein the selected rank $\hat{M}$ is calculated as $$\hat{M} = \underset{M=[1,4]}{\text{argmax}}\, [M \times Cap_M].$$

9. A wireless communications device, comprising:
means for calculating MIMO channel matrices corresponding to layer transmissions for each tone;
means for calculating signal-to-noise ratios (SNRs) for each tone based on the MIMO channel matrices;
means for mapping the SNR for each tone to generate effective SNRs for each layer transmission;
means for calculating additive white Gaussian noise (AWGN) capacities corresponding to the effective SNRs and denoted as $Cap_1$, $Cap_2$, $Cap_3$, $Cap_4$;
means for selecting an absolute highest AWGN capacity, Cap;
means for selecting a rank based on the selected absolute highest Cap; and
means for transmitting a ranking to a transmitting side which indicates the layer transmissions to select for transmission so as to maximize spectral efficiency.

10. The wireless communications device of claim 9, further comprising means for sending a quality indicator based on the selected rank.

11. The wireless communications device of claim 10, wherein the quality indicator is Carrier-Quality-to-Interference.

12. The wireless communications device of claim 9, wherein the number of the layer transmissions is at least two.

13. A computer-readable media embodying instructions executable by a processor to perform a method of rank prediction to maximize spectral efficiency in a MIMO wireless communication system, the method comprising:
calculating MIMO channel matrices corresponding to layer transmissions for each tone;
calculating signal-to-noise ratios (SNRs) for each tone based on the MIMO channel matrices;
mapping the SNR for each tone to generate effective SNRs for each layer transmission;
calculating additive white Gaussian noise (AWGN) capacities corresponding to the effective SNRs and denoted as $Cap_1$, $Cap_2$, $Cap_3$, $Cap_4$;
selecting an absolute highest AWGN capacity Cap;
selecting a rank based on the selected absolute highest Cap; and
transmitting a ranking to a transmitting side which indicates the layer transmissions to select for transmission so as to maximize spectral efficiency.

14. The computer-readable media of claim 13, wherein the instructions further comprise sending a quality indicator based on the selected rank.

15. The computer-readable media of claim 14, wherein the quality indicator is Carrier-Quality-to-Interference.

16. The computer-readable media of claim 13, wherein the number of the layer transmissions is at least two.

* * * * *